(12) United States Patent
Chang

(10) Patent No.: US 8,964,291 B2
(45) Date of Patent: Feb. 24, 2015

(54) MECHANICALLY STABILIZED OPTICAL MOUNTING ASSEMBLY

(75) Inventor: Byung J. Chang, Ann Arbor, MI (US)

(73) Assignee: General Scientific Corporation, Ann Arbor, MI (US)

( * ) Notice: Subject to any disclaimer, the term of this patent is extended or adjusted under 35 U.S.C. 154(b) by 163 days.

(21) Appl. No.: 13/570,850

(22) Filed: Aug. 9, 2012

(65) Prior Publication Data

US 2013/0094081 A1 Apr. 18, 2013

Related U.S. Application Data

(60) Continuation-in-part of application No. 12/870,957, filed on Aug. 30, 2010, which is a division of application No. 11/449,244, filed on Jun. 8, 2006, now Pat. No. 7,791,798.

(51) Int. Cl.
*G02B 23/00* (2006.01)
*G02B 7/12* (2006.01)
*G02B 23/18* (2006.01)

(52) U.S. Cl.
CPC . *G02B 7/12* (2013.01); *G02B 23/18* (2013.01)
USPC .......................................... 359/411; 359/481

(58) Field of Classification Search
None
See application file for complete search history.

(56) References Cited

U.S. PATENT DOCUMENTS

| 4,704,000 | A | | 11/1987 | Pekar et al. | |
|---|---|---|---|---|---|
| 5,361,162 | A | * | 11/1994 | Goebel | 359/411 |
| 5,381,263 | A | | 1/1995 | Nowak et al. | |
| 6,333,814 | B1 | | 12/2001 | Chang et al. | |
| 6,439,714 | B1 | | 8/2002 | Cummings | |
| 6,704,141 | B1 | | 3/2004 | Nowak et al. | |
| 7,675,678 | B2 | * | 3/2010 | Woker et al. | 359/412 |
| 7,791,798 | B2 | | 9/2010 | Cummings et al. | |
| D649,571 | S | * | 11/2011 | Cummings et al. | D16/136 |

* cited by examiner

*Primary Examiner* — Arnel C Lavarias
(74) *Attorney, Agent, or Firm* — Gifford, Krass, Sprinkle, Anderson & Citkowski, P.C.

(57) ABSTRACT

An ocular mounting assembly with mechanical stabilization includes a housing with a through-bore having an interior and opposing open ends, the interior of the through-bore being defined in part by an upper wall having a lower surface interior to the through-bore, and a lower wall having an upper surface interior to the through-bore. A pair of support arms are provided, each arm being slidingly received by a respective one of the open ends of the through-bore of the housing. A pair of stabilizing bodies are also provided, each body being positioned between a respecting one of the support arms and the interior of the housing. In contrast to existing designs, both stabilizing bodies are either positioned between a support arm and the lower surface of the upper wall of the housing, or between a support arm and the upper surface of the lower wall of the housing.

7 Claims, 6 Drawing Sheets

MECHANICALLY STABILIZED OPTICAL MOUNTING ASSEMBLY

REFERENCE TO RELATED APPLICATIONS

This application is a continuation-in-part of U.S. patent application Ser. No. 12/870,957, filed Aug. 30, 2010, which is a divisional of U.S. patent application Ser. No. 11/449,244, filed Jun. 8, 2006, now U.S. Pat. No. 7,791,798. The entire content of each application is incorporated herein by reference.

FIELD OF THE INVENTION

This invention relates generally to ocular mounting assemblies of the type used in surgical, medical and dental applications and, in particular, to an ocular mounting assembly with mechanical stabilization to minimize twisting and rotation which may otherwise cause vertical misalignment between the axes of two ocular devices.

BACKGROUND OF THE INVENTION

Telescopic instruments are widely used for magnifying a work area during precision work such as delicate surgery, dental work, inspection of circuit board solder joints, and assembly of miniature parts. A typical telemicroscopic instrument includes a pair of telemicroscopic loupes which are adjustably mounted to an eyeglass frame or headband. The telescopic loupes combine the long working distance of the telescope with the high quality magnification of the microscope. This type of optical instrument provides the user, a surgeon, for example, with a magnified image of the work area with a field of view at about an arm's length.

As one example, the ocular mounting assembly disclosed in U.S. Pat. No. 5,381,263 allows the mounting of a pair of ocular devices to an eyeglass frame, or head mount, and is linearly or rotationally adjustable through five degrees of freedom. An adjustable ocular support assembly with slidably extendable arms provides interpupillary distance, convergence angle and view adjustment of the ocular devices, which are rotatably attached to the support. An adjustable hinge/slide mount assembly is rotatably attached to the ocular support assembly and provides height and view angle adjustment of the ocular devices. When the slidable arms of the ocular support assembly are extended, however, some rotating motion may occur, in particular with heavier oculars and with fully extended support arms. The rotating motion causes vertical misalignment, or divergence, of the axes of the ocular devices. FIG. 1 shows the vertical misalignment between the axes of two ocular devices 14, when no stabilizers are included in the assembly housing 20. Excessive divergence can cause eyestrain, discomfort and even headaches.

U.S. Pat. No. 6,333,814, the entire content of which is incorporated herein by reference, improves upon the above design by providing a pair of stabilizers disposed inside the assembly housing and providing stability against rotational motion when the arms are extended. In one embodiment, the stabilizers are L-shaped, and can be either an integral part of the housing or bonded to it with adhesive. In an alternate embodiment, the stabilizers are interference-fitted balls, retained in position by retainer holes in the assembly housing, and receding into recess cut-outs at the end of the support arms when the arms are fully retracted. FIG. 2A is a top view and FIG. 2B an elevated view of part of this prior-art ocular mounting assembly showing the ocular devices 14, the supports arms 22 and the assembly housing 20. The stabilizing balls 70 are interference-fitted between the housing 20 and the slidable support arms 22 at diagonally opposite corners of the housing 20. The stabilizing effect is important when the support arms are extended outwardly from the housing. When the arms are fully retracted into the housing, the balls recede into recess cut-outs 72 at the ends of the support arms 22. FIG. 2C shows cross-section A-A of the assembly housing 20. The stabilizing ball 70 is interference-fitted between the assembly housing 20 and the support arm 22. The ball 70 is retained in place by retainer hole 74. The diameter of the retainer hole 74 is chosen to provide the desirable amount of interference fit. A large diameter allows the ball to move further into the hole, thus reducing the contact pressure on the arms.

Due to structure and operation of the ocular support arms described in the '814 patent, the design only allows for two stabilizing balls at diagonally opposite corners of the housing. The configuration is also physically bulky, limiting peripheral vision, for example, when the practitioner looks away from the loupes.

U.S. Pat. No. 7,791,798, the teachings of which are also incorporated herein by reference, describes a low-profile ocular mounting assembly wherein the top of each outwardly extending support arm is at or below the middle of the height of the housing. However, the support arms are received within the housing with sliding engagement on all sides, thereby preventing the inclusion of ball bearings or spacers to counteract twisting.

It would be advantageous to develop a mechanically stabilized optical mounting assembly that could accommodate more than a single pair of anti-twisting spacers. It would be further advantageous if the configuration was compatible with a low-profile design.

SUMMARY OF THE INVENTION

This invention relates to an ocular mounting assembly of the type used in surgical, medical and dental applications wherein opposing ocular support arms slide into, and out of, a housing in response to rotation of an interpupillary adjustment knob on the housing. The housing further includes a structure enabling the assembly to be pivotally or otherwise coupled to eyeglass frames, a headband or other mechanism enabling the ocular to be supported in front of the eyes of a user. For example, the back surface of the housing may include an extension adapted for pivotal coupling to a spectacle or headband mount.

The invention is more particularly directed to an ocular mounting assembly with mechanical stabilization to minimize twisting and rotation which may otherwise cause vertical misalignment between the axes of two ocular devices. The assembly includes a housing having a through-bore with an interior and opposing open ends, the interior of the through-bore being defined in part by an upper wall having a lower surface interior to the through-bore, and a lower wall having an upper surface interior to the through-bore. The through-bore of the housing may have a rectangular cross section.

A pair of support arms are provided, each arm being slidingly received by a respective one of the open ends of the through-bore of the housing. A pair of stabilizing bodies are also provided, each body being positioned between a respecting one of the support arms and the interior of the housing. However, in contrast to existing designs, both stabilizing bodies are either positioned between a support arm and the lower surface of the upper wall of the housing, or between a support arm and the upper surface of the lower wall of the housing.

The stabilized ocular mounting assembly may further include two pairs of stabilizing bodies, one pair being positioned between the arms and the lower surface of the upper wall of the housing, and the other pair being positioned between the arms and the upper surface of the lower wall of the housing. In the preferred embodiments, the stabilizing bodies are spherical, and are held in position by apertures through the wall of the housing against which they are positioned. Each support arm has material removed so as to create a surface spaced apart from the wall of the housing against which the stabilizing bodies are positioned, such that bodies are interference-fitted between the same inner wall of the housing and the surfaces spaced-apart therefrom.

DETAILED DESCRIPTION OF THE INVENTION

Figure 1:
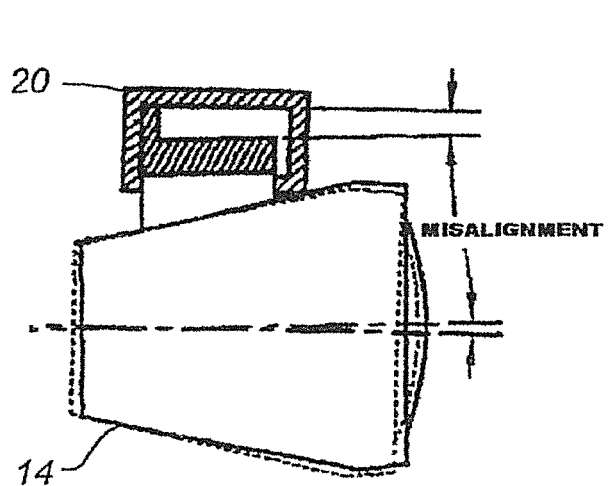
FIG. 1 is a drawing of an older style ocular mounting assembly.
Figure 2C:
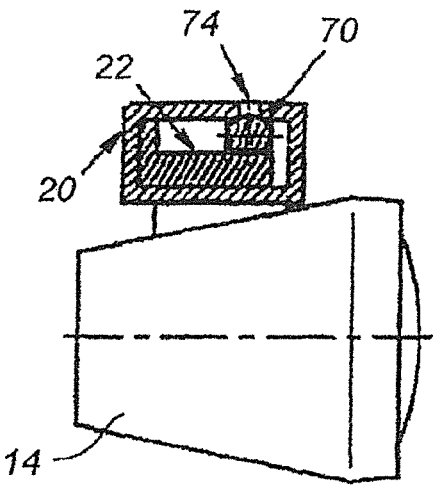
FIG. 2C shows cross-section A-A of the assembly housing of FIGS. 2A, B showing how a stabilizing ball is interference-fitted between the assembly housing and a support arm.
Figure 2A:
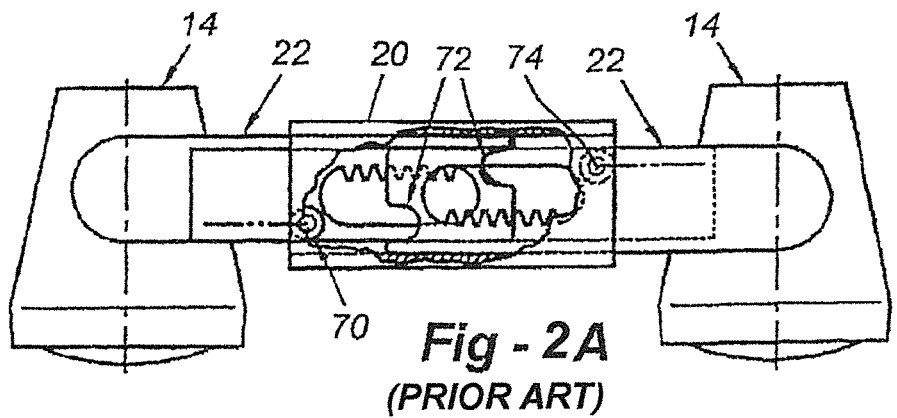
FIG. 2A is a top view of a prior-art ocular mounting assembly having a single pair of diagonally opposed stabilizing balls.
Figure 2B:
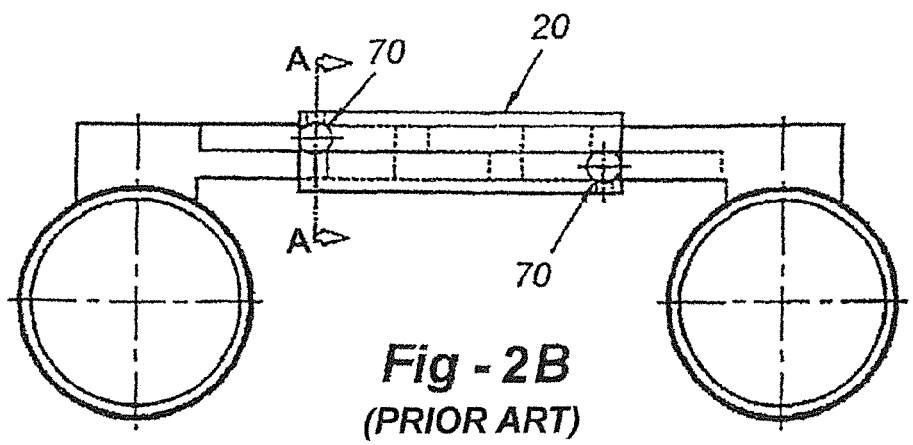
FIG. 2B is an elevated view of part of the prior-art ocular mounting assembly of FIG. 2A showing the ocular devices, the supports arms and the assembly housing.
Figure 3:
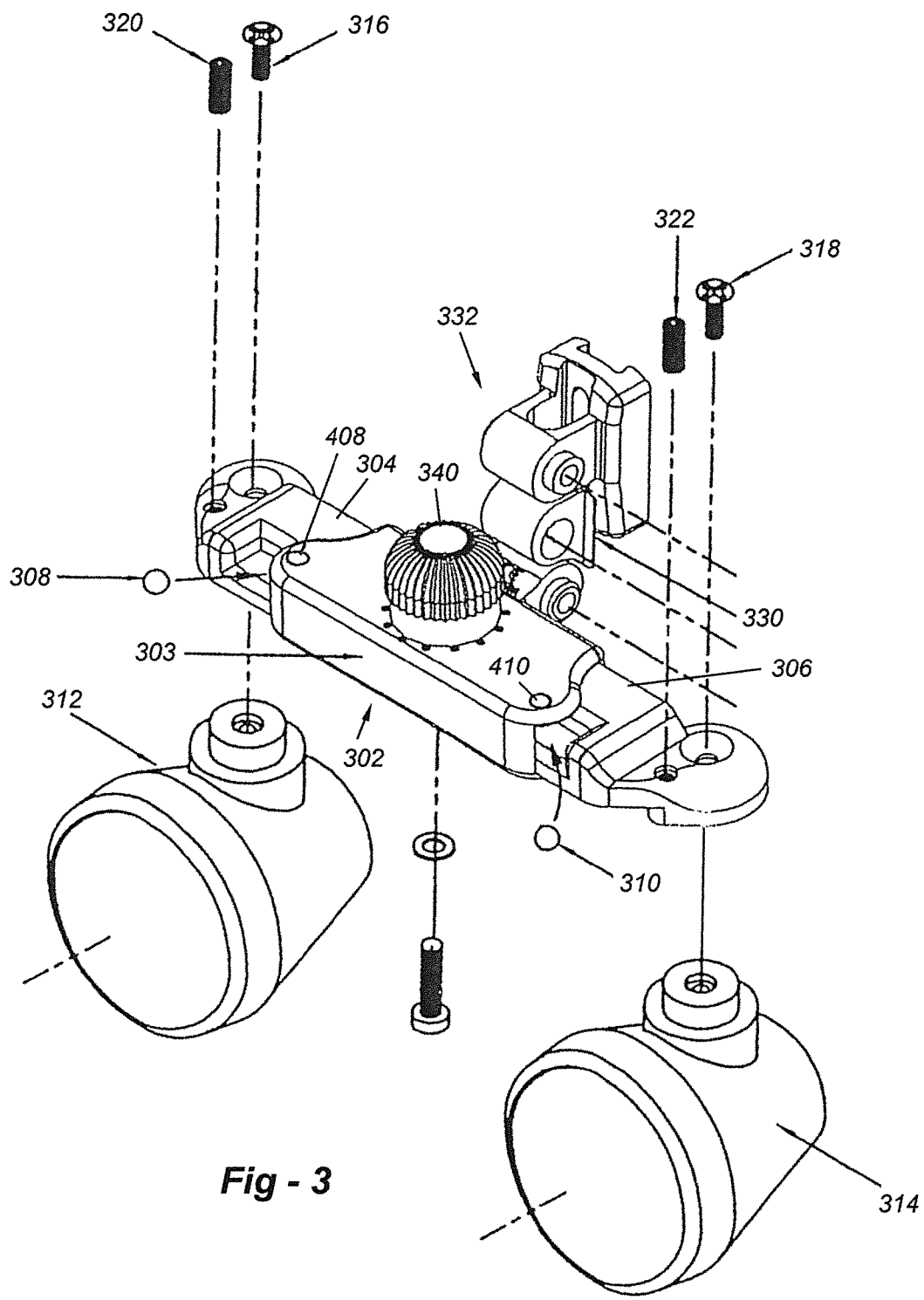
FIG. 3 is an exploded view drawing of a mounting assembly constructed in accordance with the present invention.

Having discussed FIGS. 1 and 2, the reader's attention is directed to FIG. 3, which provides an exploded view drawing of a mounting assembly to which the present invention is applicable. The invention itself specifically resides in the structure of the rack-and-pinion assembly 302 including housing 303 and opposing support arms 304, 306 and stabilizing bodies 308, 310. Although the stabilizing bodies are shown as spherical balls other shapes may be used so long as the elements prevent twisting as described herein. Further, although the bodies are shown interposed between an upper surface of each support arm and the top surface of the housing, the bodies may be placed below each support arm or both above and below each support arm for a total of four such bodies.

Before describing the rack-and-pinion assembly 302 itself, some description will be provided in terms of the environment in which the assembly 302 functions. Each support arm attached to respective ocular device 312, 314 with screws 316, 318. Set screws 320, 322 may also be provided. The rack-and-pinion assembly includes a rearward portion 330 which, in turn, is coupled to an assembly 332 providing pivotal and up-down slide functions when mounted to the central bridge of a set of eyeglass frames (not shown), for example. Once assembled, the apparatus enables the oculars 312, 314 to be oriented relative to a user's eyes, with adjustment knob 340 causing the support arms 304, 306 to be moved into and out of the housing 303 to set interpupillary distance.

Other than the aspects of the rack-and-pinion assembly 302 which enables the stabilizing bodies to be placed with respect to the upper and/or lower surfaces of both support arms as described in further detail below, the other components shown in FIG. 3 may be variable. For example, the invention is applicable to any type of loupes or ocular devices and different types of mounting systems including headband mounts and mounts which include other devices such as light sources and video cameras. The invention is likewise applicable to standard and "low-profile" designs of the type disclosed in U.S. Pat. No. 7,791,798.

Figure 4:
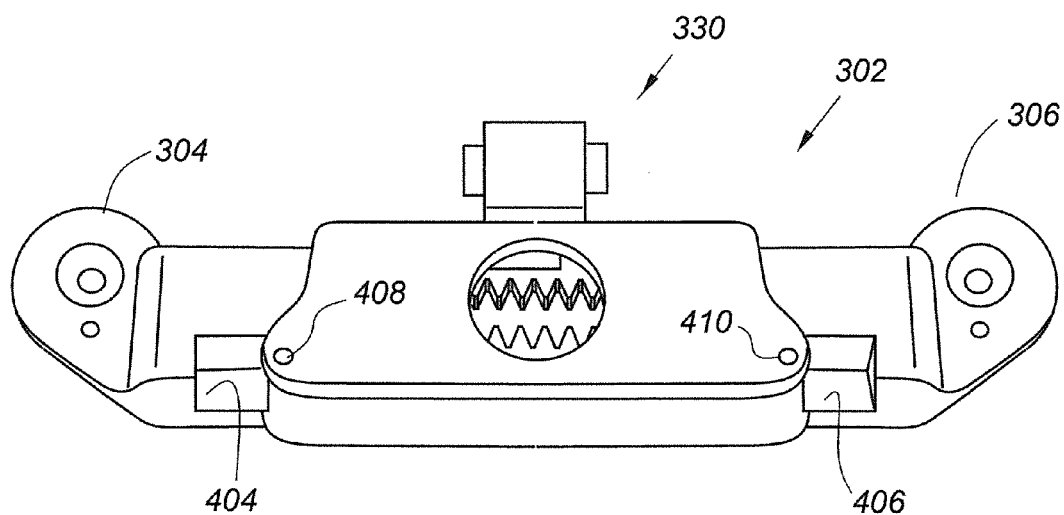
FIG. 4 is a top-oblique detail drawing of the ocular mounting assembly of FIG. 3 with the support arms retracted and the interpupillary adjustment knob removed.

FIG. 4 is a detail drawing of the rack-and-pinion assembly 302 with the interpupillary adjustment knob and oculars removed for further clarity. Removal of knob 340 reveal teeth on each support arm which interact with a gear on the knob to facilitate in-out movement. In the embodiment shown, a first stabilizing body in the shape of a sphere is positioned adjacent the upper surface 404 of arm 304, held in position by hole 408, and a second stabilizing body in the shape of a sphere, is positioned adjacent the upper surface 406 of arm 306, held in position by hole 410. In the case of spherical stabilizing bodies, the balls may or may not rotate as the arms 304, 306 move in and out.

Figure 5A:
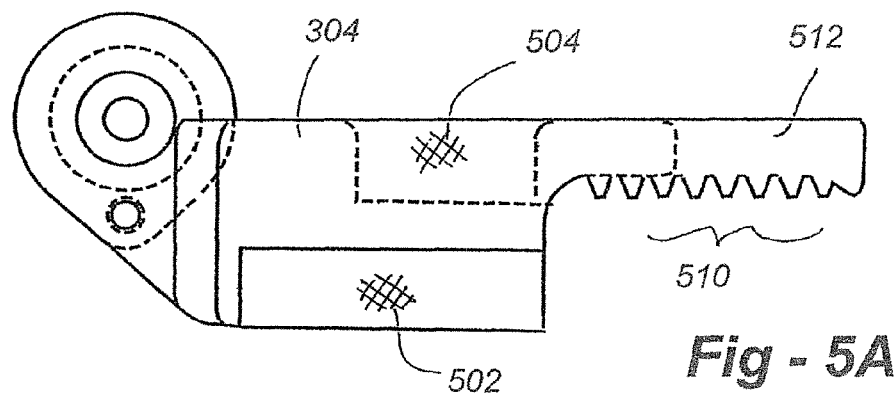
FIG. 5A is a top-down detail drawing of a right support arm according to the invention.
Figure 5B:
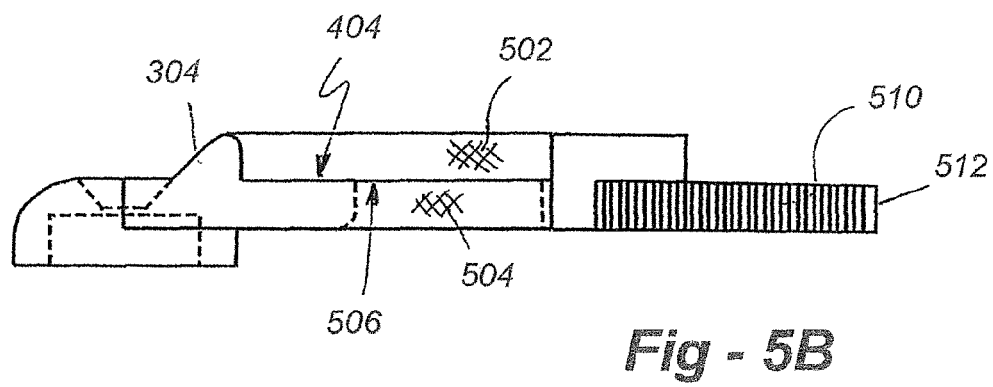
FIG. 5B is a front view detail drawing of a right support arm according to the invention.
Figure 5C:
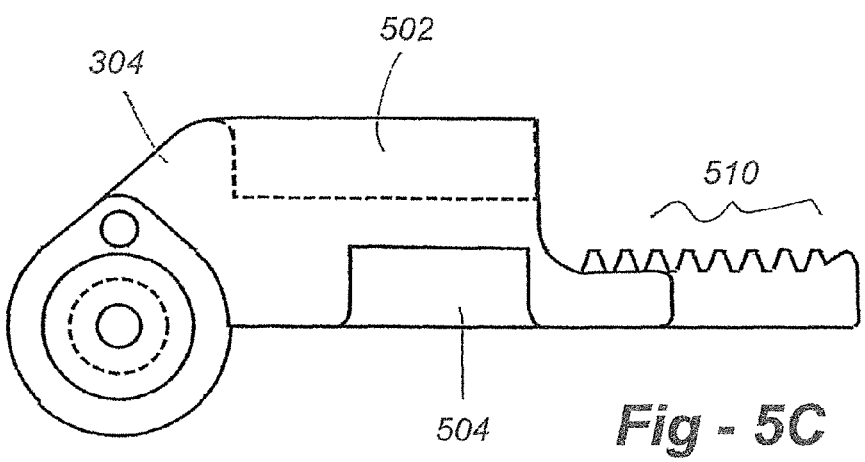
FIG. 5C is a bottom detail drawing of a right support arm according to the invention.

FIG. 5A is a top-down detail drawing of a right support arm 302 according to the invention. FIG. 5B is a front view detail drawing of the right support arm, and FIG. 5C is a bottom detail drawing of the right support arm. These views perhaps better illustrate various cavitations in the arm creating surfaces against which support bodies may be positioned. For example, material removed at 502 creates upper surface 404 also depicted in FIG. 4. Cavitated area 504 on the back side of the arm creates a lower facing surface 506 for an alternate stabilizing body location shown in FIG. 8. The teeth 510 are shown on arm appendage 512.

Figure 6A:
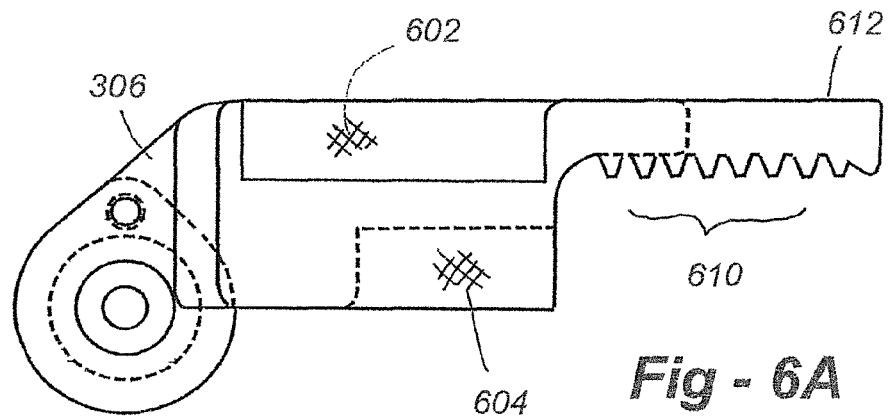
FIG. 6A is a top-down detail drawing of a left support arm according to the invention.
Figure 6B:
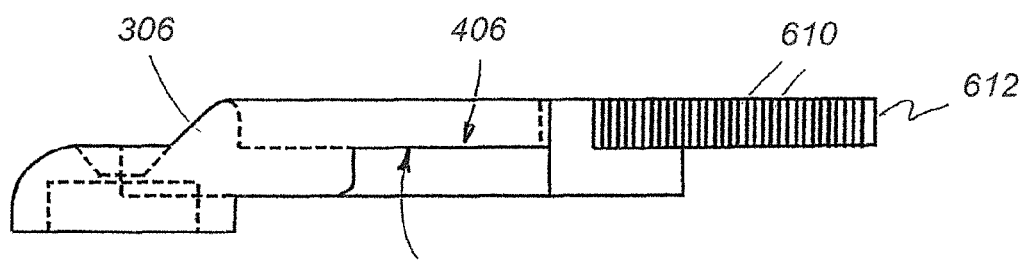
FIG. 6B is a front view detail drawing of a left support arm according to the invention.
Figure 6C:
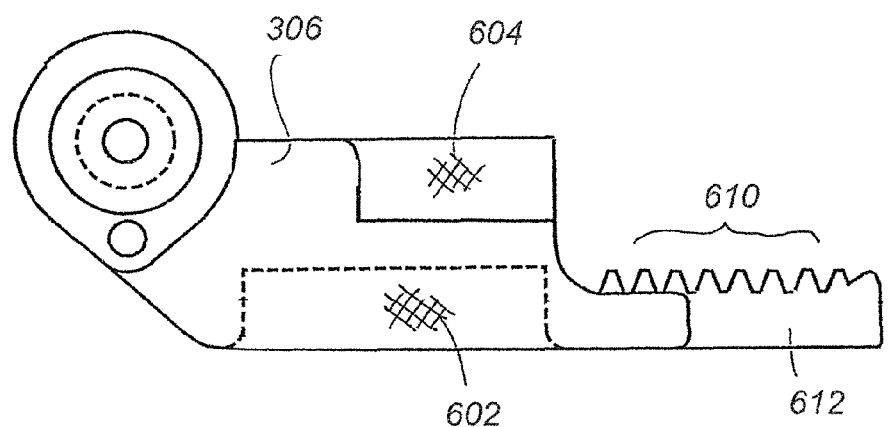
FIG. 6C is a bottom detail drawing of a left support arm according to the invention.

FIG. 6A is a top-down detail drawing of a left support arm 306 according to the invention. FIG. 6B is a front view detail drawing of the left support arm, and FIG. 6C is a bottom detail drawing of the left support arm. These views perhaps better illustrate various cavitations in the arm creating surfaces against which support bodies may be positions. For example, material removed at 602 creates upper surface 406 also depicted in FIG. 4. Cavitated area 604 on the back side of the arm creates a lower facing surface 606 for an alternate stabilizing body location shown in FIG. 8. The teeth 610 are shown on arm appendage 612.

Figure 7:
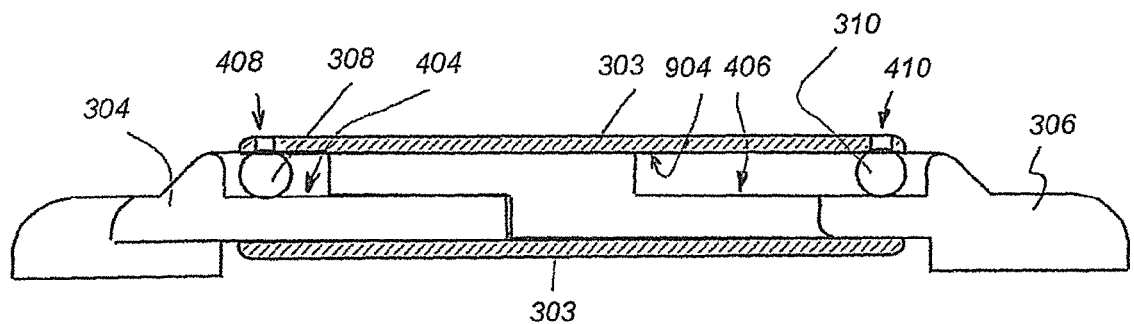
FIG. 7 is a front view of the assembly housing showing the placement of support bodies.
Figure 8:
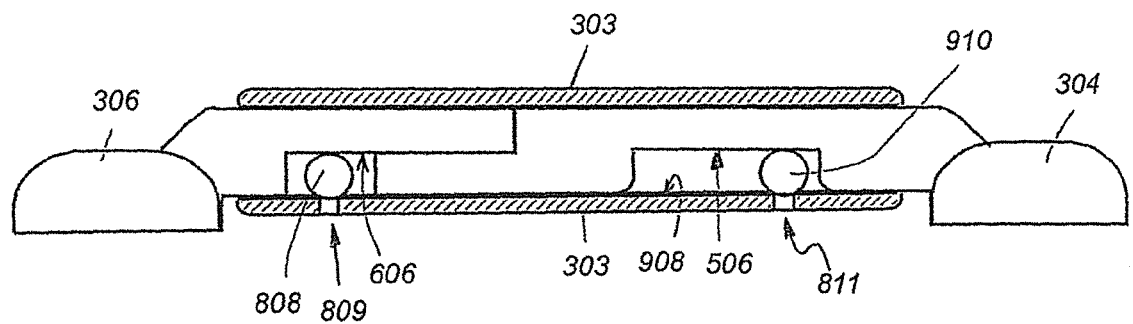
FIG. 8 is a rear view of the assembly housing showing an alternate placement of support bodies.

FIG. 7 is a front view drawing illustrating the preferred embodiment of the invention wherein stabilizing bodies 308, 310 in the form of metal, ceramic or hard plastic spheres are disposed between upwardly facing surfaces 404, 406 of the right and left support arms 304, 306 respectively, and the lower surface of the upper wall of the housing 303, shown in cross section. FIG. 8 is a rear view drawing illustrating an alternative embodiment of the invention wherein stabilizing bodies 808, 810 are disposed between lower facing surfaces 506, 606 of the right and left support arms 304, 306 respectively, and the upper surface of the lower wall of the housing 303, shown in cross section. Apertures 809, 811 are used to maintain the position of bodies 808, 810.

Figure 9:
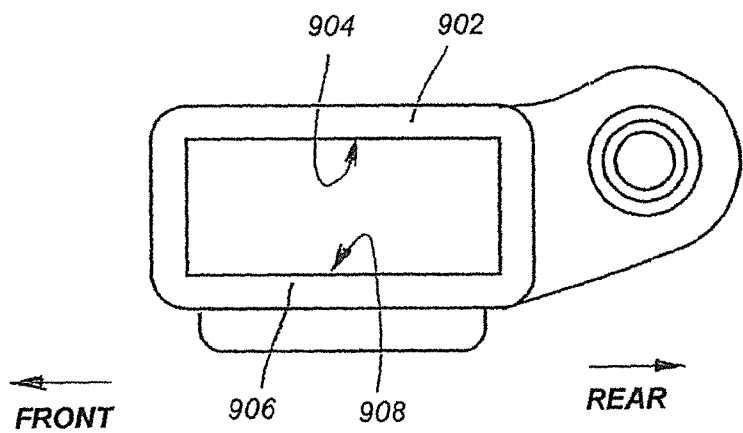
FIG. 9 is a side view of the housing without the support arms depicting the rectangular cross section thereof.

FIG. 9 is a side view of the housing 303 without the support arms depicting the rectangular cross section thereof. The upper wall is shown at 902, and the lower surface of the upper wall is shown at 904. The lower wall is shown at 906, and the upper surface of the lower wall is shown at 908. Thus, in accordance with this invention and in distinguishing contrast to existing designs, a pair of stabilizing bodies are disposed between upwardly facing surfaces of opposing support arms and the same, lower surface of the upper wall of the housing. Alternatively, or in in addition the stabilizing body placement just described, a pair of stabilizing bodies may also or additionally be disposed between downwardly facing surfaces of opposing support arms and the same, upper surface of the lower wall of the housing.

I claim:

1. A stabilized ocular mounting assembly, comprising:
   a housing having a through-bore with an interior and opposing open ends, the interior of the through-bore being defined in part by an upper wall having a lower surface interior to the through-bore, and a lower wall having an upper surface interior to the through-bore;
   a pair of support arms, each slidingly received by a respective one of the open ends of the through-bore of the housing;
   a pair of stabilizing bodies, each body being positioned between a respecting respective one of the support arms and the interior of the housing; and
   wherein each stabilizing body is either positioned between a support arm and the lower surface of the upper wall of the housing, or between a support arm and the upper surface of the lower wall of the housing.

2. The stabilized ocular mounting assembly of claim 1, including an additional pair of stabilizing bodies, with one pair being respectively positioned between each arm and the lower surface of the upper wall of the housing, and the other pair being respectively positioned between each arm and the upper surface of the lower wall of the housing.

3. The stabilized ocular mounting assembly of claim 1, wherein the stabilizing bodies are spherical.

4. The stabilized ocular mounting assembly of claim 1, wherein the stabilizing bodies are held in position by apertures through the wall of the housing against which they are positioned.

5. The stabilized ocular mounting assembly of claim 1, wherein each support arm has material removed so as to create a surface spaced apart from the wall of the housing against which the stabilizing bodies are positioned.

6. The stabilized ocular mounting assembly of claim 1, wherein the through-bore of the housing has a rectangular cross section.

7. The stabilized ocular mounting assembly of claim 1, wherein the back surface of the housing includes an extension adapted for pivotal coupling to a spectacle or headband mount.

\* \* \* \* \*